United States Patent [19]

Gutman et al.

[11] Patent Number: 4,832,841
[45] Date of Patent: May 23, 1989

[54] LIQUID TREATMENT APPARATUS

[75] Inventors: Richard G. Gutman, Oxford; Richard H. Knibbs, Oxfordshire; Gwilym H. Williams, Oxford, all of United Kingdom

[73] Assignee: British Nuclear Fuels Plc, Risley, United Kingdom

[21] Appl. No.: 83,270

[22] Filed: Aug. 10, 1987

[30] Foreign Application Priority Data

Aug. 22, 1986 [GB] United Kingdom ............... 8620468

[51] Int. Cl.$^4$ ............................................. B01D 29/14
[52] U.S. Cl. ...................... 210/232; 210/247; 210/321.89; 210/422; 210/323.2
[58] Field of Search ............ 210/247, 232, 323.2, 210/321.89, 261, 422; 55/16, 158

[56] References Cited

U.S. PATENT DOCUMENTS

| | | | |
|---|---|---|---|
| 3,169,109 | 2/1965 | Hirs | 210/247 |
| 4,092,398 | 5/1978 | Miyake et al. | 423/7 |
| 4,097,375 | 6/1978 | Molitor | 210/644 |
| 4,517,086 | 5/1985 | Romey et al. | 210/323.2 |
| 4,547,289 | 10/1985 | Okano et al. | 210/321.89 |
| 4,711,723 | 12/1987 | Bray | 210/261 |
| 4,732,673 | 3/1988 | Degard et al. | 210/321.79 |

FOREIGN PATENT DOCUMENTS

| | | | |
|---|---|---|---|
| 0137877 | 4/1985 | European Pat. Off. | |
| 0624890 | 9/1961 | Italy | 210/323.2 |
| 1468928 | 3/1977 | United Kingdom | |

Primary Examiner—Richard V. Fisher
Assistant Examiner—Coreen Y. Lee
Attorney, Agent, or Firm—William R. Hinds

[57] ABSTRACT

A liquid treatment apparatus suitable for dewatering a radioactive sludge includes a cylindrical housing (14) open at one end and defining two ports (24, 26) for the sludge, one near the open end and the other at the closed end. A plug (30) locates in the open end of the housing and supports a module (44) comprising a sealed permeate-collecting chamber (46) through which extend a number of permeable-walled tubes (54), open at each end. The plug defines a header chamber (40) for the tubes (54) which communicates with the one sludge port (24); and defines an outlet duct (62, 38) for the permeate liquid. The apparatus can be installed remotely within a shielded enclosure (12), and the plug and module can be withdrawn without risking contamination of the permeate liquid.

5 Claims, 3 Drawing Sheets

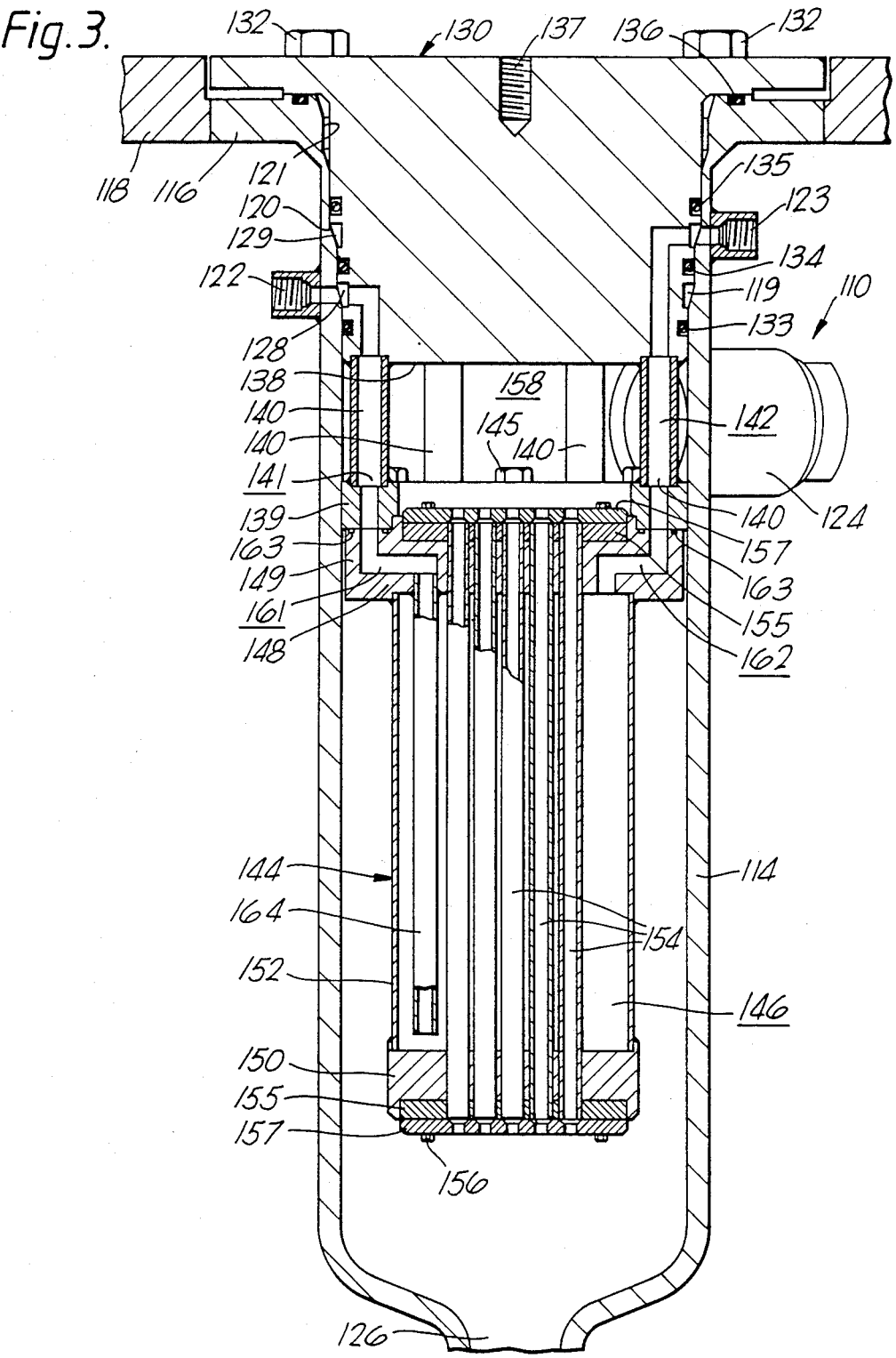

LIQUID TREATMENT APPARATUS

This invention relates to liquid treatment apparatus comprising one or more ducts through which a liquid is to be passed, each duct having a wall permeable to at least a component of the liquid, and particularly but not exclusively to ultrafiltration apparatus.

A known ultrafiltration apparatus, described in British Pat. No. GB 1 468 928 (Union Carbide Corp.), comprises a plurality of parallel tubes arranged so that a liquid to be treated passes under pressure axially through the tubes. The tubes are porous and permeable, being composed of bonded carbon particles and an essentially continuous coating of metal oxide particles on the inside surface of the tubes. In operation of the apparatus some of the liquid and low molecular weight dissolved phases pass through the walls of the tubes, while most of the higher molecular weight dissolved phases and any particulate matter are carried through the tubes in the liquid concentrate.

Such an apparatus may be used to separate pure water from an oil/water or oil/water/dirt emulsion. Equally it may be used to remove water from a sludge of particulate matter and water. For example it might be used to dewater a sludge containing low-level radioactive material, before immobilizing the sludge by the addition of cement. Another ultrafiltration device is known from U.S. Pat. No. 3,722,594 (Agranat) which includes a removable and replaceable filter cartridge comprising a number of parallel filter tubes through which a liquid undergoing treatment is passed, the cartridge extending between two the cartridge. However this device is difficult to use where installation must be performed remotely or where the apparatus itself must be located within a shielded enclosure providing limited access, because when assembling the device each cartridge must seal to the headers at each end. Furthermore when a filter cartridge is removed drops of untreated liquid may fall from the end of the filter tubes into the surrounding chamber, so contaminating the permeate liquid.

According to the present invention there is provided a liquid treatment apparatus comprising: a housing open at one end, defining near the open end a first port for a liquid undergoing treatment, the housing also defining a second port for the liquid undergoing treatment; a module insertable into the housing and comprising one or more tubes, each having a wall permeable to at least a component of the liquid undergoing treatment, and a permeatecollecting chamber surrounding the tubes; and a plug insertable into the open end of the housing and connectable to the module, the plug defining a header chamber to which after connection the tubes of the module communicate and to which after insertion the first port communicates, and a duct which after connection communicates with the permeate-collecting chamber for outflow of permeate liquid.

The apparatus is preferably arranged upright, with the open end of the housing at the top. It can readily be installed or dismantled remotely, as access to only one end of the housing (the open end) is needed, and furthermore where radioactive liquid is to be treated the apparatus can be installed in a shielded enclosure with only the open end of the housing extending through a wall of the enclosure. Preferably the housing also defines, nearer to the open end than the first port, an outlet port for the permeate liquid to which the duct in the plug communicates. On removal of the plug and the module from the housing there is little likelihood of any contamination being transferred from the module to the permeate outlet port.

Desirably the apparatus incorporates means to rinse the outside of the module during removal thereof. If the apparatus is upright, the second port is preferably at the closed, lower, end of the housing; any contaminated material rinsed off the outside of the module is therefore returned to the rest of the liquid undergoing treatment.

The invention will now be further described by way of example only, and with reference to the accompanying drawings in which:

FIG. 3 shows a longitudinal section view of an alternative ultrafiltration apparatus.

Figure 1:
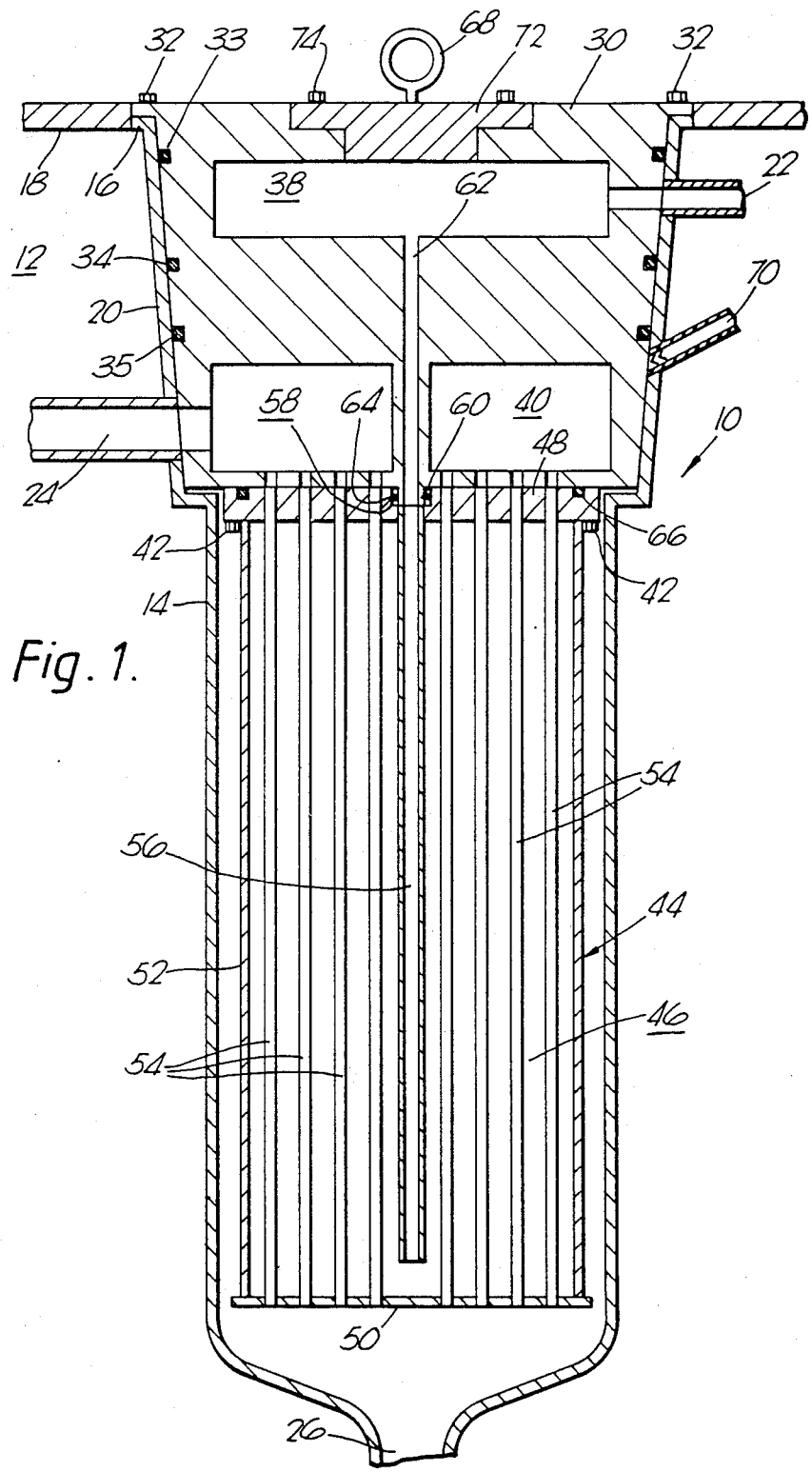
FIG. 1 shows a longitudinal sectional view of an ultrafiltration apparatus.

Referring to FIG. 1, an ultrafiltration apparatus 10 is shown for dewatering a radioactive sludge, the apparatus 10 being installed within a shielded enclosure 12. The apparatus 10 includes a steel housing 14 of generally cylindrical shape with its longitudinal axis upright, open at its top end and with an external flange 16 around the open end by which it is supported through a hole in the roof 18 of the enclosure 12. An upper portion 20 of the housing 14 is slightly tapered; near the top of the portion 20 is an outlet duct 22 for a permeate liquid, while near the bottom of the portion 20 is a first duct 24 for the sludge. A second duct 26 for the sludge communicates with the bottom of the housing 14.

Within the upper portion 20 of the housing 14 is a steel plug 30 of complementary taper, secured to the housing by bolts 32 and sealed to the housing by three peripheral O-ring seals 33, 34 and 35 in respective grooves. The plug 30 is partly hollow, defining an upper chamber 38 which communicates with the outlet duct 22; and a lower annular chamber 40 which communicates with the first sludge duct 24. Clamped onto the underside of the plug 30 by bolts 42 is an ultrafiltration module 44. The module 44 consists of a sealed permeate-collecting chamber 46 defined by an upper end plate 48, a lower end plate 50 and a cylindrical impermeable sleeve 52; and a number of parallel ultrafiltration tubes 54 (only eight are shown) which extend between the upper and lower end plates 48 and 50, passing through respective holes in each plate and being sealed to each plate 48 and 50. The base of the plug 30 is perforated by holes aligned with the holes in the upper end plate 48 of the module 44, so that the tubes 54 communicate at their upper ends with the annular chamber 40 in the plug 30. A pipe 56 open at its lower end extends downwardly from the centre of the upper end plate 48 to near the bottom of the chamber 46; the upper end of the pipe 56 extends through the end plate 48 to a recess 58 in the top of the end plate 48. A hollow boss 60 on the underside of the plug 30 mates with the recess 58, and a duct 62 extends from the hollow boss 60 to the upper chamber 38 in the plug 30. The module 44 and the plug 30 are sealed to each other by an O-ring seal 64 within the recess 58, and a peripheral O-ring seal 66 in a groove in the upper face of the end plate 48.

It will be appreciated that the plug 30 and the module 44, clamped together as shown, can readily be lifted out of the housing 14 if desired, after removing the bolts 32. A ring 68 is provided on the top of the plug 30 to facilitate this operation. Whilst the module 44 is being removed, any sludge adhering to the outside of it may be rinsed off by jets of water emerging from a wash jet ring 70 in the upper portion 20 of the housing 14. Furthermore, access to the upper chamber 38 in the plug 30 may be achieved through a lid 72, clamped onto the plug 30 by bolts 74.

In operation of the apparatus 10, radioactive sludge to be dewatered is supplied at high pressure to one or other of the first and second ducts 24 and 26; dewatered sludge will emerge through the other duct. For example, sludge might be supplied through the first duct 24, to flow into the annular chamber 40, through the tubes 54, into the lower part of the housing 14 to emerge through the second duct 26. Each tube 54 is of bonded carbon particles with an essentially continuous coating of metal oxide particles on its inside surface, the permeability being such that with a pressure difference of several atmospheres (for example 700 kPa) water from the sludge is caused to pass through the walls of the tubes 54. The water, i.e. the permeate liquid, collects in the chamber 46, and then flows up the pipe 56 and the duct 62 to the upper chamber 38 in the plug 30, to emerge from the outlet duct 22.

After use of the apparatus 10 as described, the chamber 46 will contain water. This can be removed either by applying a low pressure (a partial vacuum) to the outlet duct 22; or by supplying air under pressure through either the first or the second duct 24 or 26.

Figure 2A:
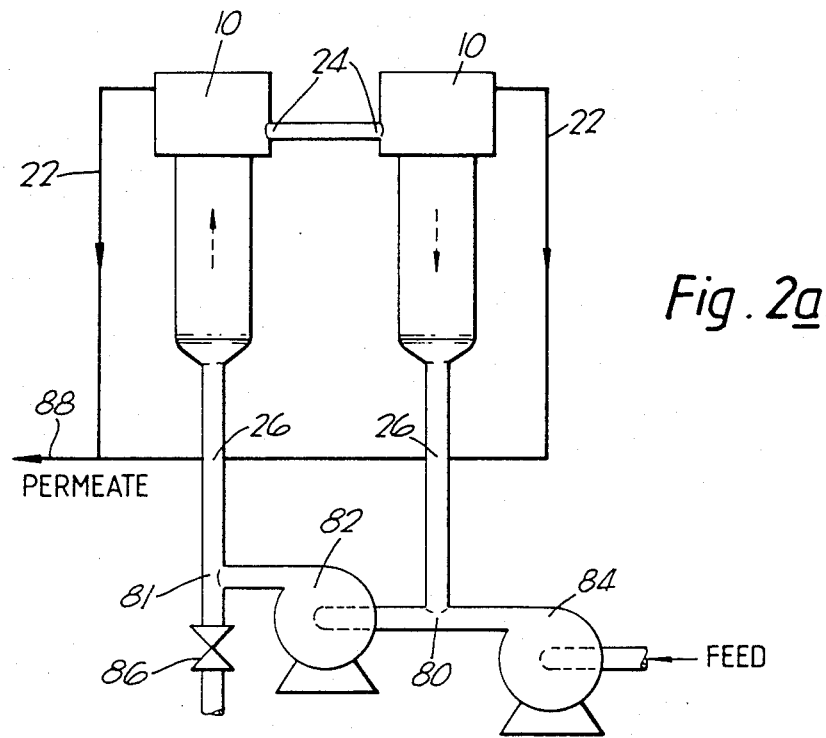
FIGS. 2a and 2b show diagrammatic views of liquid treatment plants using the apparatus of FIG. 1.
Figure 2B:
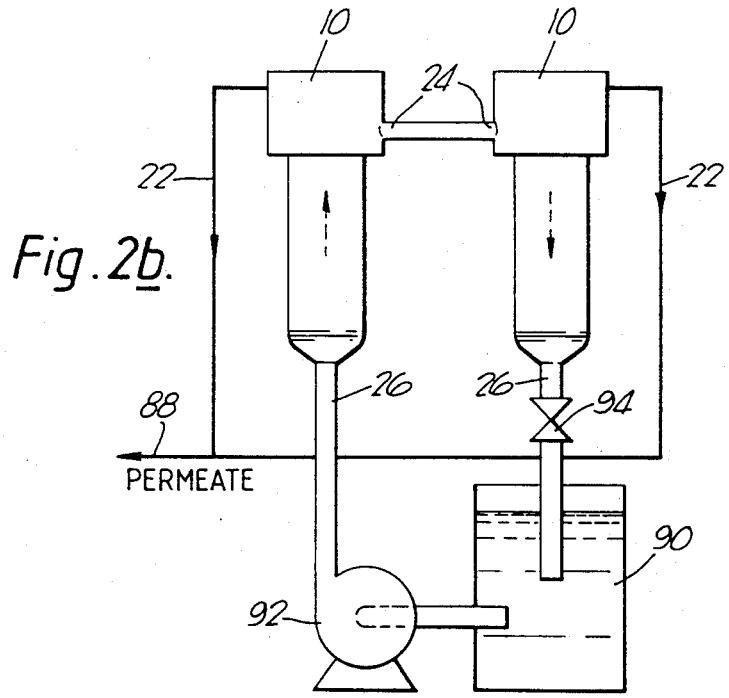

Referring now to FIGS. 2a and 2b, these show diagrammatically two different liquid treatment plants utilising, in each case, two identical ultrafiltration apparatuses 10. FIG. 2a shows a plant for concentration of dilute feed up to say 10% by weight of solids, and comprises two ultrafiltration apparatuses 10, whose first sludge ducts 24 are joined together, and whose second sludge ducts 26 intercommunicate via a T-junction 80, a recirculation pump 82 and a T-junction 81. The feed is supplied by a pump 84 to the other arm of the T-junction 80, and a discharge valve 86 is connected to the other arm of the T-junction 81. The two permeate outlet ducts 22 join to define a common outlet duct 88. In operation the sludge pressure is maintained high by the feed pump 84, and the sludge is recirculated through the two apparatuses 10 by the pump 82. At intermittent intervals some of the sludge is discharged through the valve 86. Water emerges through the outlet duct 88.

FIG. 2b shows a plant for concentration of sludge stored in a tank 90 to a high solids content. The two first sludge ducts 24 are joined together, and the two permeate outlet ducts 22 join to define a common outlet duct 88, as in the plant of FIG. 2a. Sludge from the tank 90 is fed under pressure by a pump 92 to the second sludge duct 26 of one apparatus 10; and after passing through both the ultrafiltration apparatuses 10 it emerges through the second sludge duct 26 to the other apparatus 10, through a pressure maintaining valve 94 and back to the tank 90. The sludge is recirculated until a desired solids concentration is achieved.

Referring to FIG. 3 there is shown an alterative ultrafiltration apparatus 110 which operates in a similar fashion to that of FIG. 1, and which could be used in the treatment plants of FIGS. 2a and 2b in place of the apparatuses 10. The apparatus 110 includes a stainless steel housing 114 of generally cylindrical shape with its longitudinal axis upright, open at its top end and with an external flange 116 around the open end by which it is supported through a hole in a horizontal support plate 118. Towards the open end the bore of the housing 114 is stepped outwardly by two successive sloping steps 119 and 120, and by a third step 121 around the open end, the intervening portions of the bore being cylindrical. At the level of the steps 119 and 120 the housing defines two ports 122 and 123 which are at opposite sides of the housing 114. A larger-diameter first duct 124 for a sludge to be treated communicates with the housing 114 a short distance below the lower step 119, and a second duct 126 for the sludge communicates with the bottom of the housing 114.

Within the upper part of the housing 114 is a steel plug 130 of generally complementary shape to the bore of the housing 114 except that it defines two circumferential grooves or channels 128 and 129 at the levels of the steps 119 and 120 respectively, and that it is not stepped outwardly to mate with the third step 121. The plug 130 is secured to the flange 116 of the housing 114 by bolts 132 and is sealed to the housing by three peripheral O-ring seals 133, 134 and 135 in grooves respectively below, between, and above the two circumferential channels 128 and 129. Another O-ring seal 136 locates in a groove on the upper surface of the flange 116. A threaded recess 137 in the top surface of the plug 130 facilitates raising and lowering of the plug 130.

The plug 130 defines a lower plane surface 138 just above the top of the first duct 124, and includes an annular flange 139 just below the first duct 124, spaced apart from the surface 138 by six tubular pillars 140, (only four are shown). Two ducts 141 and 142 are defined through the plug 130, extending from diametrally opposed positions on the underside of the annular flange 139, through two of the pillars 140, and communicating with the circumferential channels 128 and 129 respectively.

An ultrafiltration module 144 is clamped to the underside of the annular flange 139 by bolts 145. The module 144 is similar to the module 44 of FIG. 1, and consists of a sealed permeate-collecting chamber 146 defined by an upper end plate 148, a lower end plate 150 and a cylindrical sleeve 152, and a number of ultrafiltration tubes 154 (only five are shown) which extend between the upper and lower end plates 148 and 150. The upper end plate 148 includes a flange portion 149 which locates against the annular flange 139 of the plug 130. The tubes 154 extend through respective holes in each plate 148 and 150 and are sealed at each end by a rubber gasket 155 clamped by bolts 156 between the plate 148 and 150 and a perforated steel backing plate 157. Consequently at the lower end of the module 144 the tubes 154 communicate with the housing 114, and at the upper end of the module 144 they communicate with a cylindrical chamber 158 defined between the plane surface 138, and the flange 139 and the upper perforated plate 158.

Two ducts 161 and 162 extend through the upper end plate 148 providing communication between the chamber 146 and the two ducts 141 and 142 which extend through the plug 130, O-ring seals 163 being provided grooves in the upper surface of the flange portion 149. The duct 161 communicates with the bottom end of the chamber 146 by virtue of a pipe extending downwardly from the end plate 148, whereas the duct 162 opens into the top of the chamber 146.

In operation of the apparatus 10, a sludge to be dewatered is supplied at high pressure to one or other of the ducts 124 and 126, and after flowing through the chamber 158 and the tubes 154 of the module 144, dewatered sludge will emerge through the other duct 124 or 126.

Permeate water from the sludge passes through the walls of the tubes 154 into the chamber 146, initially displacing air which flows through the ducts 162 and 142, and the circumferential channel 129, to emerge from the port 123. Once the air has been displaced, flow from the port 123 is prevented, so that permeate water flows up the pipe 164, through the ducts 161 and 141 and the circumferential channel 128, to emerge from the port 122. After use of the apparatus 110 has finished, water remaining in the chamber 146 may be expelled through the port 122 by application of pressurised air to the port 123; alternatively if it is desired to reduce the deposition of sludge onto the inside of the walls of the tubes 154, this may be achieved by backwashing, with port 122 closed and the application of a pressure pulse to the port 123 to force permeate liquid back through the walls of the tubes 154.

Although in FIG. 3 the plug 130 is shown with the duct 141 aligned with the port 122, and the duct 142 aligned with the port 123, it will be appreciated that this orientation of the plug 130 is not essential because of the provision of the circumferential channels 128 and 129. It will also be appreciated that to enable the assembled plug 130 and module 144 to be removed from and inserted into the housing 114 there must be some clearance between the outside of the annular flange 139 and the housing 114—for example for an apparatus 110 of bore 300 mm and overall height about a meter there might be a clearance of about 0.5 mm. Consequently a small amount of sludge may by-pass the ultrafiltration module 144 flowing instead through this narrow gap. This will however be a negligible proportion of the sludge being treated, and indeed ensures that sludge in this vicinity does not dry out (which would make removal of the assembled plug 130 and module 144 from the housing 114 more difficult). It will also be understood that if desired the apparatus 110 may be provided with a wash jet ring similar to that of FIG. 1.

We claim:

1. A liquid treatment apparatus comprising: a housing open at one end, and a module insertable into the housing and comprising one or more tubes, each having a wall permeable to at least a component of the liquid undergoing treatment, wherein the housing defines near the open end a first port for a liquid undergoing treatment, and also defines a second port for the liquid undergoing treatment; the module including a permeate-collecting chamber formed by impermeable walls surrounding the tubes; and the apparatus also comprises a plug insertable into the open end of the housing and connectable to the module, the plug including a header chamber to which after connection the tubes of the module communicate and to which after insertion the first port communicates, and a duct which after connection communicates with the permeate-collecting chamber for outflow of permeate liquid.

2. An apparatus as claimed in claim 1 wherein the plug defines two ducts therethrough which after connection communicates with the permeate-collecting chamber and the module includes a tube within the chamber arranged such that the said ducts communicate with opposite ends of the chamber.

3. An apparatus as claimed in claim 1 wherein the housing also defines, nearer to the open end than the first port, an outlet port for the permeate liquid to which the duct in the plug communicates.

4. An apparatus as claimed in claim 3 wherein the plug defines a circumferential channel to which the duct communicates.

5. An apparatus as claimed in claim 1 wherein said housing further comprises means to rinse the outside of the module during removal thereof.

* * * * *